Sept. 27, 1932.  J. C. McCUNE  1,879,702
MAGNET SUPPORTING DEVICE
Filed Sept. 25, 1930
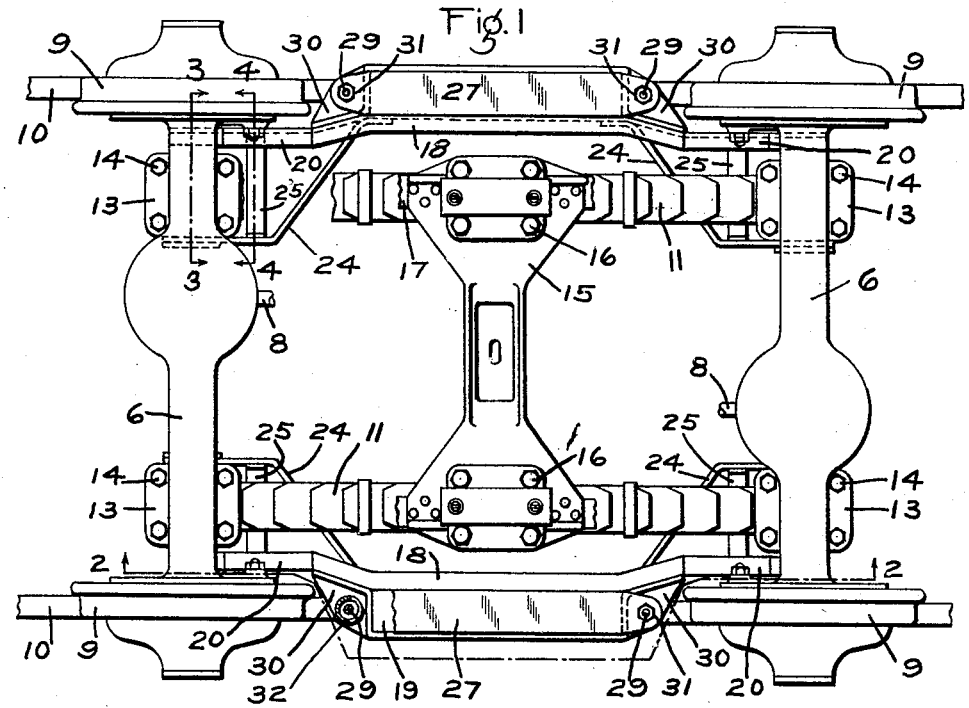
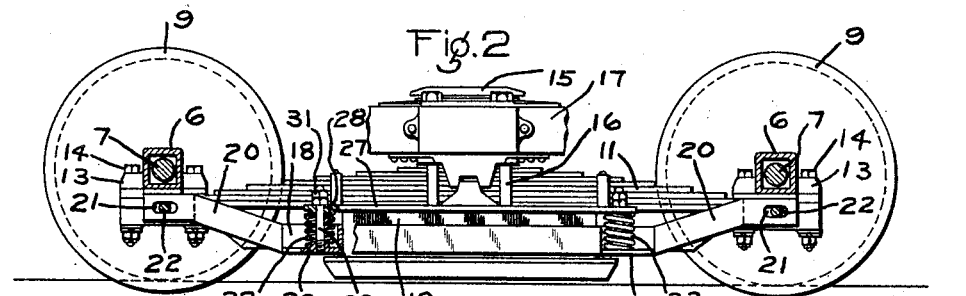
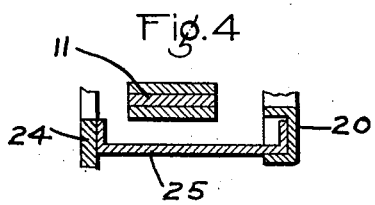
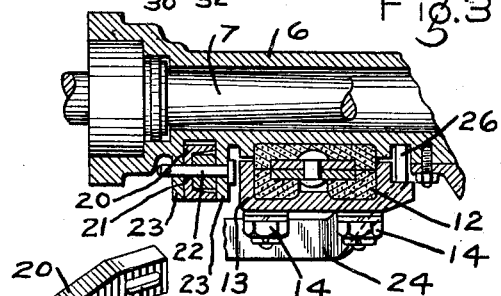
INVENTOR.
JOSEPH C. McCUNE
BY *Wm. M. Cady*
ATTORNEY.

Patented Sept. 27, 1932

1,879,702

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

MAGNET SUPPORTING DEVICE

Application filed September 25, 1930. Serial No. 484,293.

This invention relates to magnet supporting devices, and more particularly to a supporting means for brake or traction increasing magnets associated with car trucks.

When auxiliary devices, such for instance as magnetic brake shoes, magnetic traction increasers, and the like, are installed on a car truck, it has been the practice to attach the same to a rigid portion of the car truck, such as the side frames, since it is desirable to suspend the auxiliary devices between the wheels on each side of the car truck at a predetermined distance above the rails.

In the construction of one type of car truck, the body supporting member or bolster is supported on leaf springs arranged between a pair of axles. The ends of the springs are fixed to the axle housings, and the springs are disposed at right angles to the axles and parallel to the rails. The body supporting member or bolster overlies the springs.

With this type of car truck, since the springs provide the only means for connecting the two axles of the truck together, there are no portions of the car truck which remain at a fixed distance above the rails, other than the axle housings.

An object of the invention is to provide an improved means for mounting auxiliary devices, such as magnetic brake shoes, magnetic traction increasers and the like, on a car truck of the above type, by which the auxiliary devices are suspended directly from the axle housings.

Another object of the invention is to provide an improved magnet supporting means of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing; Figure 1 is a plan of a car truck showing the application of my invention thereto; Fig. 2 is a vertical section taken on the line 2—2 of Fig. 1; Fig. 3 is a vertical transverse section taken on the line 3—3 of Fig. 1; Fig. 4 is a similar view taken on the line 4—4 of Fig. 1; and Fig. 5 is a detail perspective of a portion of the magnetic brake shoe carrier.

Referring to the drawing, the car truck may comprise two spaced axle housings 6, each containing an axle 7 adapted to be driven from an electric motor (not shown), through a shaft 8 which projects through the axle housing. Fixed to the ends of the axles 7, are flanged wheels 9, adapted to rest on rails 10.

Connecting the axle housings 6, is a pair of springs 11. As shown, the springs 11 may be composed of a plurality of superposed leaves of varying lengths, the longer spring leaves being under the shorter leaves. The springs are disposed at each side of the car truck, and substantially parallel the rails 10. The ends of the springs are mounted in pads 12 carried by brackets 13 on the under side of the axle housings 6, in the manner shown best in Fig. 3. The brackets may be composed of two pieces, one of which is formed integrally with the axle housing and the other in the form of a plate detachably secured to the fixed piece by bolts 14.

Disposed transversely of the car truck and overlying the springs 11, is a body supporting member or bolster 15. Near each end, the bolster is secured to the central portion of each of the springs 11, by bolts 16. Also secured to each end of the bolster 15, are side frames 17, which also overlie the springs. Since the side pieces 17 do not form any part of the present invention, only a portion thereof is shown.

With the body of the car resting on the bolster 15, the load is transmitted from the bolster, through the springs 11 to the axle housing 6. When the load is increased, the springs 11 are deflected downwardly and the wheel base, or the distance between the axles, will be increased, and when the load is lightened and the springs return toward their normal positions, the wheel base will be correspondingly decreased. Therefore, since the main portions of the car truck are mounted on the springs, these portions move or vibrate upwardly and downwardly under the influence of the load on the truck.

In the present case, I have shown the car truck equipped with magnetic brake shoes 19, a carrier 18 being provided on each side of the car truck for each brake shoe.

For the purpose of attaching the carrier 18 to the car truck, the rear portion of the carrier is provided with oppositely projecting arms 20. These arms are so formed as to extend rearwardly and then upwardly from the main body portion of the carrier, so that when the carrier is applied to a car truck, the main body portion of the carrier will be disposed in a plane below the axles.

Near each end, the arms 20 are provided with a longitudinal slot 21, through which is passed a pin 22, carried by spaced flanges 23 which depend from the axle housing 6.

For the purpose of reenforcement, each end of the carrier is provided with a brace. As shown, each of the braces may be composed of two pieces 24 and 25, of strip material. The piece 24 projects rearwardly at an acute angle from the carrier and its free end is disposed in a recess 26 on the under side of the axle housing 6. The piece 25 projects at right angles from the carrier and underlies the spring 11. The adjoining portions of both pieces are welded together and the inner ends of both pieces may be secured to the carrier by welding.

By this construction, the carrier 18 is rigidly mounted on the car truck, and limited longitudinal movement of the axle housings relative to each other is permitted due to the manner of securing the ends of the carrier, as well as the ends of the braces to the axle housings.

The magnetic brake shoe 19 may be of any approved type. In the form shown, this device comprises an elongated body which is adapted to be disposed over the rail 10.

In order to support the magnetic brake shoe 19 in such a manner as to prevent lateral as well as longitudinal movement thereof, the main body portion of the carrier 18 is made in the form of a frame. This frame is closed at the sides and ends and open at the top and bottom, so as to provide a pocket for receiving the magnetic brake shoe 19.

The top 27 of the magnetic brake shoe 19 is extended, so as to project beyond the ends of the frame portion of the carrier 18, and near each end, the top 27 is provided with an opening 28. Passing through the opening 28, is a rod 29, which has its lower end threaded into a bracket 30 projecting from the carrier 18, and its upper end threaded for the reception of nuts 31.

The magnetic brake shoe 19 is yieldingly maintained away from the rail by springs 32 which surround the rods 29 and are interposed between the brackets 30 and the extended portions of the top 27.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination with a car truck having a pair of spaced axles provided with housings connected together by flexible body supporting members adapted to move the axles toward and away from each other under influence of varying loads on the car truck, of an auxiliary magnet device, means for suspending the magnet device from the car truck, comprising a rigid member extending between the axles and supported at each end by the axle housings, and means permitting relative movement of the axles toward and away from each other with respect to said member.

2. The combination with a car truck having a pair of spaced axles provided with housings, spring members extending longitudinally of the car truck and connected at each end to the axle housings, of an auxiliary magnet device, and means for suspending the magnet device from the car truck, comprising a member having an arm extending outwardly from each end thereof, pins carried by the axle housing for supporting said arms, said pins being received in elongated slots in said member, which permits movement of the axle housings relative to said member.

3. The combination with a car truck having a pair of spaced axles provided with housings, spring members extending longitudinally of the car truck and connected at each end to the axle housings, of an auxiliary magnet device, and means for suspending the magnet device from the car truck, comprising a member, pins carried by said housings at one side thereof and extending into slots provided in said member, and elements secured to said member and supported in said housings at the opposite side thereof so as to permit longitudinal movement of said elements relative to said housings.

In testimony whereof I have hereunto set my hand, this 22 day of Sept., 1930.

JOSEPH C. McCUNE.